United States Patent
Sihver et al.

(10) Patent No.: US 6,345,081 B1
(45) Date of Patent: Feb. 5, 2002

(54) METHOD AND A DEVICE FOR EVALUATING THE INTEGRITY OF THE NUCLEAR FUEL IN A NUCLEAR PLANT

(75) Inventors: Lembit Sihver, Västerås; Inger Arlebåck, Surahammar; Björn Bjurman, Östhammar, all of (SE)

(73) Assignee: Westinghouse Atom AB, Vasteras (SE)

( * ) Notice: Subject to any disclaimer, the term of this patent is extended or adjusted under 35 U.S.C. 154(b) by 0 days.

(21) Appl. No.: 09/530,902
(22) PCT Filed: Nov. 20, 1998
(86) PCT No.: PCT/SE98/02116
§ 371 Date: Jun. 29, 2000
§ 102(e) Date: Jun. 29, 2000
(87) PCT Pub. No.: WO99/27541
PCT Pub. Date: Jun. 3, 1999

(30) Foreign Application Priority Data

Nov. 21, 1997 (SE) .............................. 9704286

(51) Int. Cl.$^7$ .......................... G21C 17/06; G21C 17/07
(52) U.S. Cl. ....................... 376/245; 376/249; 376/250; 376/251
(58) Field of Search ................................ 376/245, 246, 376/247, 248, 249, 250, 251

(56) References Cited

U.S. PATENT DOCUMENTS

| | | | | |
|---|---|---|---|---|
| 3,632,470 A | * | 1/1972 | Rubin et al. ................. | 376/251 |
| 3,748,864 A | * | 7/1973 | Lofredo et al. ............... | 62/656 |
| 3,786,257 A | * | 1/1974 | Weiss et al. ................. | 376/253 |
| 3,878,040 A | * | 4/1975 | Martucci .................... | 376/253 |
| 4,034,599 A | | 7/1977 | Osborne | |
| 4,080,250 A | * | 3/1978 | Honekamp et al. .......... | 376/251 |
| 4,126,514 A | * | 11/1978 | Wonn ......................... | 376/252 |
| 4,764,335 A | * | 8/1988 | Gross et al. ................ | 376/253 |
| 5,537,450 A | | 7/1996 | Asay et al. | |

FOREIGN PATENT DOCUMENTS

| | | |
|---|---|---|
| EP | 0 036 332 A1 | 3/1981 |
| EP | 0 677 853 A1 | 4/1995 |
| SE | 8503721-6 | 6/1989 |

* cited by examiner

*Primary Examiner*—Charles T. Jordan
*Assistant Examiner*—Yvonne R. Abbott
(74) *Attorney, Agent, or Firm*—Connolly Bove Lodge & Hutz

(57) ABSTRACT

The invention concerns a method and a device for evaluating the integrity of the nuclear fuel in a nuclear plant having a reactor (1) enclosing a reactor core formed by a number of fuel cladding members (2) arranged to enclose said nuclear fuel. The value of each of a number of parameters including activity data (4) of the off-gases from the reactor is determined. The value of each of a number of second parameters including chemical data and activity data of the liquid (5) flowing through the reactor is determined. The value of each of a number of operational parameters (6) including at least one of the reactor effects, control rod position, actual fuel type, flow of off-gases, and flow of the liquid flowing through the reactor is determined. The value of the first and second parameters are standardized (7, 8) in relation to the values of said operational parameters. The standardized values and the values of the operational parameters are analysed (9–11) and the integrity of the fuel is estimated based on the analysis. The invention also comprises producing guidelines for the continuing operation of the plant with regard to said estimation.

12 Claims, 2 Drawing Sheets

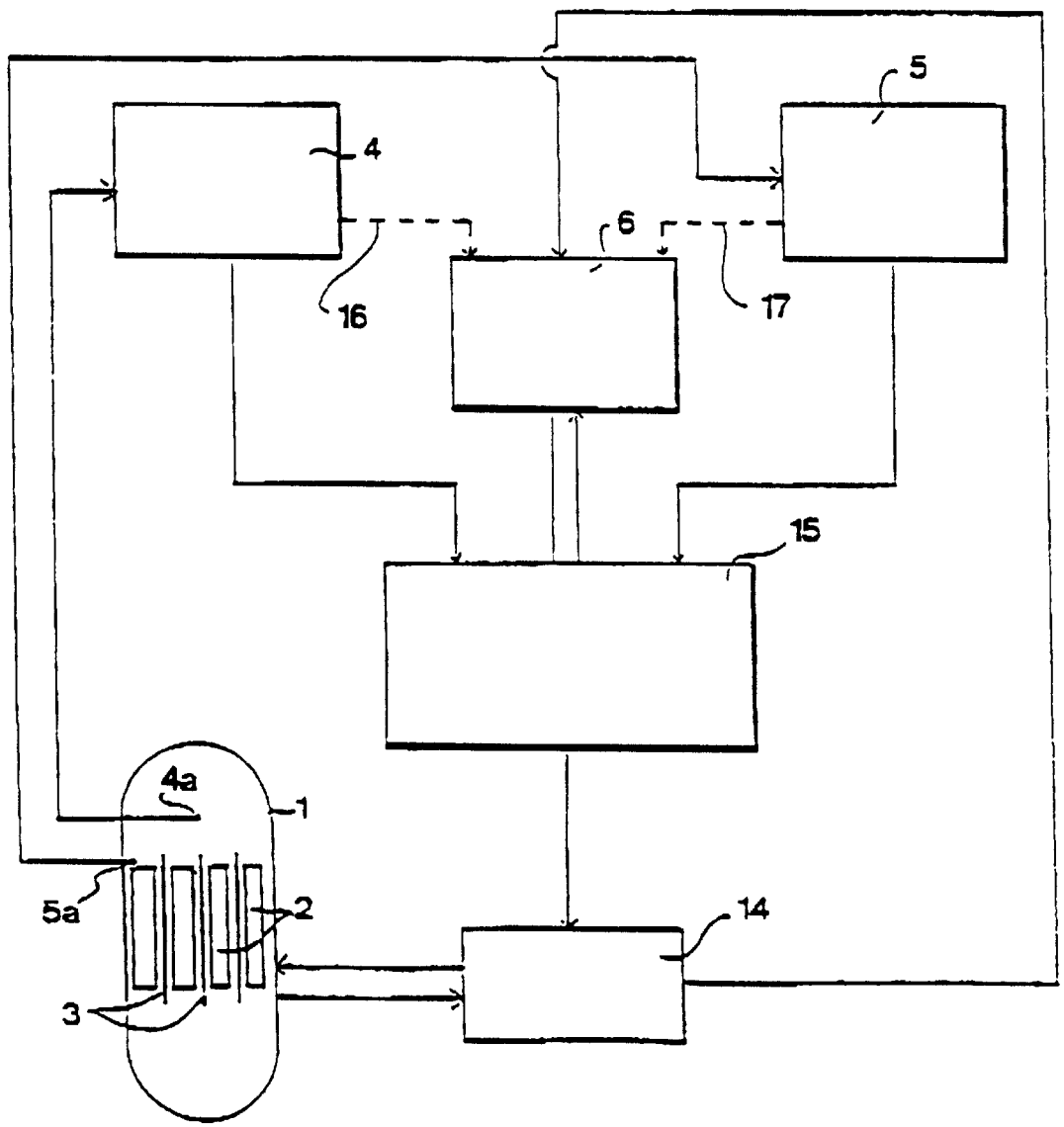

METHOD AND A DEVICE FOR EVALUATING THE INTEGRITY OF THE NUCLEAR FUEL IN A NUCLEAR PLANT

THE BACKGROUND OF THE INVENTION AND PRIOR ART

The present invention refers to a method and a device for evaluating the integrity of the nuclear fuel in a nuclear plant having a reactor enclosing a reactor core comprising a number of fuel cladding members in which said fuel is present.

A core in a nuclear reactor comprises a plurality of fuel assemblies which are vertically provided with a certain distance from each other. The core is enclosed in a reactor vessel and submerged in a liquid, i.e. reactor water functioning as cooling medium as well as neutron moderator and flowing through the reactor vessel. The nuclear reactor also comprises a plurality of control rods which by being displaced into and out of the core regulate the effect produced by the reactor, and shut down and start, respectively, the reactor. A fuel assembly comprises a plurality of fuel rods vertically provided and each containing a staple of circular cylindrical, so called pellets of a nuclear fuel. Each fuel rod comprises a cladding tube which normally is manufactured in a zirconium alloy and which encloses the staple of fuel pellets. During an ongoing nuclear reaction, i.e. during the burn-up of the nuclear fuel, fission gases are formed which comprise radioactive inert gases and which normally are maintained within the fuel rod by means of the cladding tube. Such fission gases comprise different nuclides of xenon and krypton.

During operation it sometimes happens that a defect appears on a cladding tube. The first defect which appears on a cladding tube, for instance as a consequence of mechanical wear, is called a primary defect. The primary defect consists of a relatively small hole or a relatively small crack through which fission gases may be released. Such a primary defect is normally not particularly serious as such. However, after a period of time a primary defect may develop to a larger defect, a so-called secondary defect, which is more serious and consists of a larger hole or a crack extending axially along or essentially perpendicular to the longitudinal direction of the cladding tube. Such a secondary defect may arise by the penetration of water and steam into the fuel rod at the primary defect and by water and steam penetrating into the fuel rod at the primary defect and, by hydration, making the cladding tube brittle which after a certain period of time cracks during thermal or mechanical load or due to tensions caused by the hydrides themselves. By a secondary defect, also other fission products, such as iodine and caesium, are, except the fission gases previously mentioned, released. In case of a really serious fuel defect, for instance due to the fact that a fuel cladding tube is broken, also uranium and plutonium may start to leak out into the core. In order to prevent the occurrence of a more serious defect, it is of course important to detect a fuel defect at an early stage and adapt or interrupt the continuing operation of the reactor.

The defects on the cladding tubes may have many different grounds. In case of a too fast effect increase in the fuel, a combination of tension, due to the thermal extension, and chemical influence on the inner side of the cladding tube may result in the cracking of the cladding tube. This type of defect is called PCI (Pellet Cladding Interaction).

Another primary defect type is a so-called, debris defect, i.e. debris such as metal chips or the like, which causes wear defects on the cladding tubes from outside. Experience has shown that for instance in connection with repair and service of a nuclear reactor, such debris may be introduced and thereafter be carried by the water circulating through the core and give rise to a wear defect in the form of a primary defect on the cladding tube. A further type of defect may depend on a manufacturing failure. Finally, a so-called Dry-Out is also to be mentioned, which means that the liquid film which normally always is present on the outer side of the cladding tubes is evaporated. This leads to a quick local temperature increase in the fuel rod. Such a temperature increase leads to the melting of the cladding tube if the operation of the reactor is not immediately interrupted.

The development from a primary defect which is not serious as such to a secondary defect is influenced and may be accelerated by the manner in which the reactor is operated. If, for instance, the reactor is operated with a high effect or if many control rod movements are performed in the proximity of a defect, the defect may develop faster than it would have done at a lower reactor effect or if the control rods would have been maintained in a position. By stopping the reactor after a primary defect has occurred, the water flow into the defect fuel rod is increased and the degradation, i.e. the development towards a secondary defect, is accelerated.

If a fuel defect occurs and is detected during operation of a nuclear reactor, the people responsible for the operation may choose between shutting down immediately the reactor and replacing the defect fuel rod, or continuing the operation of the reactor, possibly by a locally reduced effect, until the next point of time for service and fuel replacement when the reactor is to be shut down. Normally, i.e. if no serious fuel defects have been detected, such a fuel replacement takes place once a year. The first alternative, i.e. to shut down the reactor, is very costly and ought to be avoided except at a serious fuel defect when the core may be more contaminated than is tolerated by the limits defined. In case of a PCI-defect, it would be sufficient to reduce the effect in the part of the core where the defect fuel rod is located. If the fuel defect is a debris defect, the reactor may be further operated at full effect until the next fuel replacement.

In order to determine if the reactor is to be shut down, if an effect reduction is sufficient or if it is possible to continue the operation at full effect, it is necessary to know the actual type of defect, where the defect is positioned, the size of the defect and the risk of degradation of the defect. These questions are very difficult to answer in a secure and reliable manner by the technique available today. Another problem in this connection is the determination if the primary defect has developed to a secondary defect or if a further primary defect has occurred in the case that higher activity levels of the reactor off-gases have been measured. Today, it is for the people responsible for the chemistry and the operation, in co-operation, to evaluate the type of the defect and to take a decision whether and how the reactor is to be operated further based on the activity levels measured and their experiences.

One way of detecting a fuel defect is to measure the total percentage of the radioactive inert gases in the reactor off-gases. One problem in this connection is that there are two different sources of radioactive inert gases, partly from the fuel due to a defect on the cladding tube and partly due to core contamination, i.e. from fissionable compounds being deposited onto different surfaces in the reactor core. By an increased number of fuel defects, which have occurred previously, this contamination increases and is therefore a growing source of error. However, the inert gases released from the core contamination contain a higher percentage of short-lived nuclides than the gases from a fuel defect.

Devices for detecting the presence of a fuel defect are known, for instance such a device is disclosed in U.S. Pat. No. 5 537 450. In this document, a device is disclosed which detects fuel defects on-line, i.e. during reactor operation, by leading a part of the off-gases from the reactor via a gammaspectrograph which continuously measures the nuclide composition and the activity level of the off-gases. It is also known to determine the position of a fuel defect by a method called flux-tilting, which involves the regulation of one control rod at a time in such a manner that the effect is changed locally in the core at the same time as the activity level in the off-gases is measured. An increase of the activity level in the off-gases may be noted during control rod movements in the proximity of the fuel defect. In such a manner, the fuel defect may be located. However, during the time of location, the effect of the reactor has to be reduced to between 60 and 80% of full effect. The reduction of the effect of the reactor to such a degree is costly and is to be avoided, if possible. Therefore, it is of course essential to realize if it is possible to postpone such a flux-tilting operation to a point of time when the reactor effect is to be reduced anyway. Furthermore, this method has the disadvantage that the control rod movements as such may deteriorate a defect already existing or accelerate the development of the defect towards a secondary defect.

SUMMARY OF THE INVENTION

The object of the present invention is to provide a method enabling a minimizing of the consequences of a nuclear fuel defect in a nuclear plant. Furthermore, an object of the present invention is to determine an essentially optimal way of continuing the operation of the plant in essentially each operation situation. According to a further aspect of the invention, an object is an automatic method, i.e. an automatic determination of the way of continuing the operation, which thus is not related to the individual.

This object is obtained by the method initially defined and comprising the steps of:
  determining the value of each of a number of first parameters including activity data of the off-gases from the reactor,
  determining the value of each of a number of second parameters including chemical data and activity data of the liquid flowing through the reactor,
  determining the value of each of a number of operational parameters including at least one of the reactor effect, control rod position, actual fuel type, flow of off-gases, and flow of the liquid flowing through the reactor,
  standardizing said values of the first and second parameters in relation to said values of the operational parameters,
  analysing said standardized vales and said values of the operational parameters, and
  estimating the integrity of the fuel based on said analysis.

By such a method which in an automatic manner takes into consideration a very large amount of available data of the function of the reactor, it is possible to obtain a relatively reliable knowledge of the integrity of the nuclear fuel during operation of the reactor. The integrity of the nuclear fuel means how the fuel and its possible substances and by-products, which are produced as a consequence of the ongoing nuclear reaction, are retained and will be retained in the fuel cladding members intended therefore. Thus, the integrity of the nuclear fuel is influenced by defects and crack formations of the fuel cladding members, the ageing of the fuel cladding member, as well as any other fuel leakage. From such a knowledge, it is then possible to determine if and how the reactor is to be operated further and according to an advantage embodiment of the invention, the method comprises the step of producing guidelines for the continuing operation of the plant with regard to said estimation. Consequently, by means of this knowledge it is possible to determine that a fuel defect has occurred and if the defect is of such a kind that, for instance, a flux-tilting operation is to be employed in order to exactly locate the defect for initiating a local effect reduction or enable replacement of the defect fuel cladding member.

According to a further embodiment of the invention, the method also comprises controlling the plant with regard to said guidelines. Thus, in accordance with the invention it is possible to control at least some functions in response to said guidelines in an automatic manner. Thereby, it is advantageous that said guidelines are produced essentially continuously at least during the operation of the plant. In such a manner, the guidelines may always correspond to the most actual values of said parameters. If, in addition, according to a further embodiment of the invention, the determining of the value of said first parameters is performed essentially continuously during the operation of the plant, the actual condition in the reactor with respect to the percentage of fission gases in the off-gases of the reactor may always form the basis for the continuing operation of the reactor.

According to a further embodiment of the invention, said analysis is performed with regard to historical data concerning said parameters. Such historical data may advantageously derive from the actual reactor but may also comprise data deriving from experiences gained during operation of other reactors. Advantageously, such historical data are obtained from a memory unit in which they are stored. Furthermore, said values may be supplied to the memory unit for updating and completion thereof. Such a memory unit, the data bank of which in such a manner may be expanded to be more and more extensive the longer the reactor is operated, consequently functions as a kind of reference library by which an appearing defect condition may be compared with previous similar conditions in the reactor. Advantageously, said values are supplied to the memory unit essentially continuously during the operation of the plant.

According to a further embodiment of the invention, said analysis comprises a comparison of said standardized values and said values of said operational parameters with said historical data and predetermined data. Such predetermined data may for instance include different limit values which may not be exceeded or which involve a determined measure if exceeded. By such a comparison, it is thus possible to take into consideration all available data for determining a fuel defect and the type of defect. However, it is to be noted that in order to perform the method according to the invention it is necessary to give an exact answer to the actual type of defect. It is rather essential to understand the extension and the expected development of the defect, which may form the basis for the continuing operation of the reactor.

The above-defined object is also obtained by the device initially defined and comprising:
  first means arranged to enable the determining of the value of each of a number of first parameters including activity data of the off-gases from the reactor,
  second means arranged to enable the determining of the value of each of a number of second parameters including chemical data and activity data of the liquid flowing through the reactor,
  third means arranged to enable the determining of the value of each of a number of operational parameters including at least one of the reactor effect, control rod position, actual fuel type, flow of off-gases, and flow of the liquid flowing through the reactor, fourth means arranged to enable the standardizing of said values of the first and second parameters in relation to said values of the operational parameters, fifth means arranged to enable the analysing of said standardized values and said values of the operational parameters, and sixth means arranged to enable the estimating of the integrity of the fuel based on said analysis. By such a device, it is possible to determine a fuel defect in a very reliable manner and by an at least reduced need of a subjective, individual-related judgement.

BRIEF DESCRIPTION OF THE DRAWINGS

The present invention is now to be described more closely by means of an embodiment and with reference to the drawings attached, in which FIG. 1 discloses a schematical flow chart over different method steps according to an embodiment of the invention, and FIG. 2 discloses a block diagram of the structure of a device according to the invention.

DETAILED DESCRIPTION OF A PREFERRED EMBODIMENT OF THE INVENTION

Figure 1:
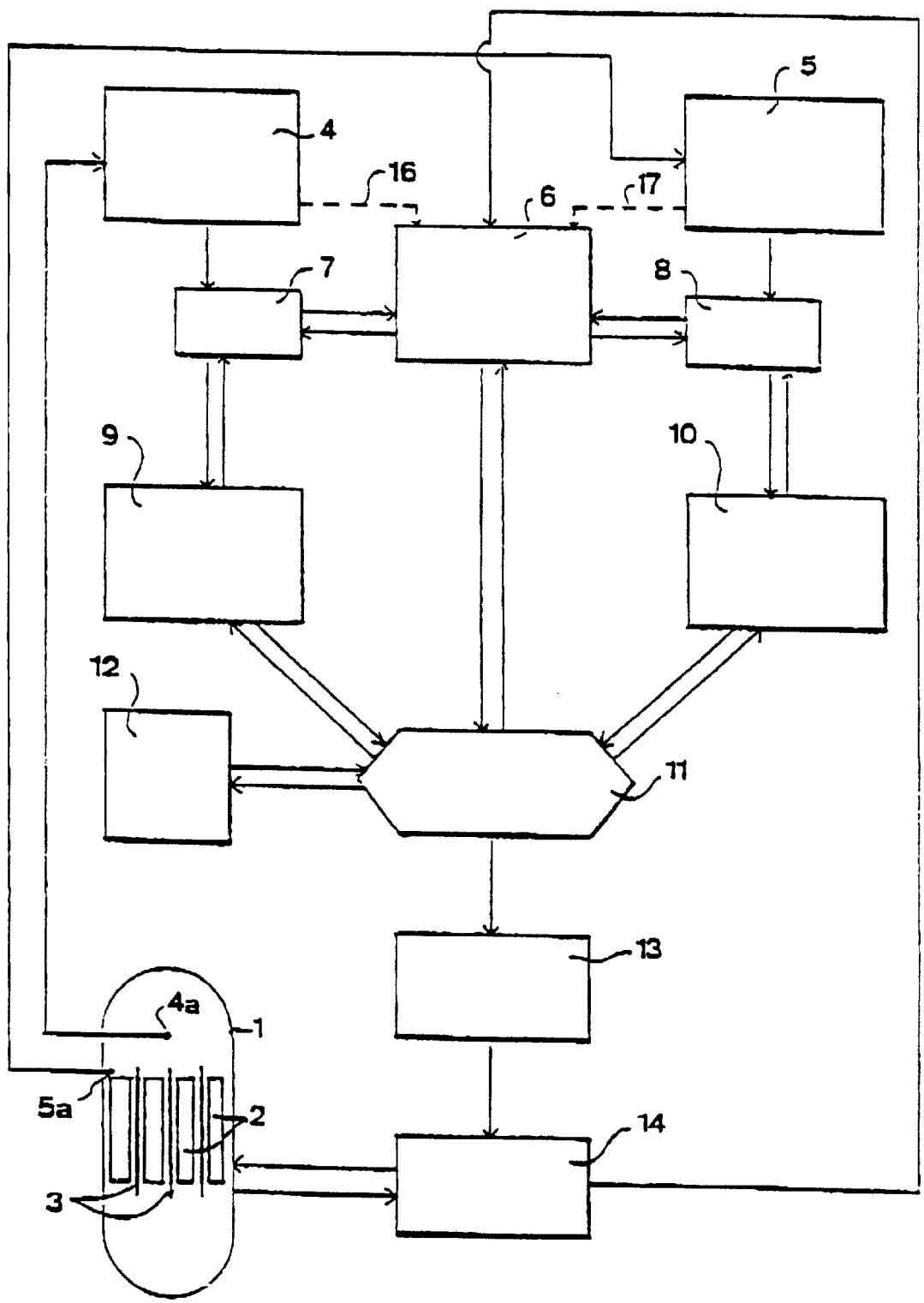

The method according to the invention is now to be described with reference to the flow chart of FIG. 1. The method is applicable to a nuclear plant having a reactor 1 which encloses a reactor core formed by a number of schematically disclosed fuel cladding members 2 which each encloses a number of nuclear fuel pellets. The reactor 1 is controlled by means of a number of control rods 3, which are displaceable into and out from the core between the fuel cladding members 2, and by regulating the water flow into and out from the core. It is to be noted that the flow chart disclosed in FIG. 1 is a model of a method for determining the integrity of the nuclear fuel. The invention is not limited to this model but the model may be designed in many different ways.

The box 4 represents a unit for determining the value of a number of parameters including activity data from the off-gases leaving the reactor 1. This unit 4 may for instance comprise a computer having a number of different detectors and instruments, which are disclosed schematically at 4a and are arranged to measure the percentage of different fission gases in the off-gases and by which such determinations may be done. Thereby, it is possible on the one hand to measure absolute values of the percentage of different fission gases and on the other hand to determine relations or quotients between different nuclides, for instance between relatively long-lived and relatively short-lived isotopes being present in the fission gases. Examples of measurable fission gases are $^{133}$Xe, $^{133}$Xe$^m$, $^{135}$Xe, $^{135}$Xe$^m$, $^{137}$Xe, $^{138}$Xe, $^{85}$Kr, $^{85}$Kr$^m$, $^{87}$Kr, $^{88}$Kr, $^{89}$Kr, etc. Interesting relations or quotients are for instance $^{133}$Xe/$^{135}$Xe, $^{133}$Xe/$^{138}$Xe, etc. These absolute values and quotients may advantageously be measured and detected continuously during the operation of the reactor 1.

The box 5 represents a unit for determining the value of a number of other parameters including chemical data, such as for instance dosing of different substances to the reactor water, and activity data of the reactor water flowing through the core. In this case, the unit 5 may comprise a computer having different types of detectors or measurement equipment for the determination of absolute values of for instance $^{131}$I, $^{132}$I, $^{133}$I, $^{134}$I, $^{135}$I, $^{134}$Cs, $^{136}$Cs, $^{137}$Cs, $^{239}$Np, etc., as well as for determining relations or quotients such as for instance $^{131}$I/$^{133}$I, $^{134}$Cs/$^{137}$Cs, $^{136}$Cs/$^{137}$Cs, etc. These parameters concerning water chemical data may be determined manually at regular time intervals but also continuously by means of a more sophisticated equipment.

The box 6 represents a unit for determining the value of a number of operational parameters including for instance the reactor effect produced, off-gas flow, reactor water flow, control rod history, i.e. how the different control rods have been displaced, different fuel types being present in the actual reactor core, the burn-up degree of the fuel in different parts of the reactor core, the average power density of the reactor core, etc. The unit 6 may comprise a computer and advantageously form a part of the process computer plant forming the control system of the nuclear plant.

The units 4 and 6 are connected to the box 7 representing a unit comprising a computer for standardizing said measured off-gas data in relation to the determined operational data. For instance, it may be mentioned that the activity measured of a certain nuclide will vary with the velocity of the off-gas flow due to the half-life of the nuclide. The percentage of fission gases also increases with an increasing reactor effect. In order to obtain comparable data, it is consequently essential to make such a standardization of the fission gases measured.

The units 5 and 6 are connected to the box 8 which in a corresponding manner represents a unit comprising a computer for standardizing the measured values of the chemical data of the reactor water.

The box 9 represents a unit which is connected to the unit 7 and which comprises a computer for analysing said off-gas data measured. The measured absolute values of the percentages of different fission gases may as such give several different pieces of information about the condition in the reactor and by such a first analysis of off-gas data, one may for instance determine if any fuel defect is really present. The percentage of fission gases and the composition of the fission gases also vary with the out-burning degree of the fuel, for instance the relation or quotient between the percentage of krypton and the percentage of xenon gives an indication of the out-burning degree. If this indication points at a high out-burning degree, one may thus determine that a possible fuel defect originates from a part of the core which has been charged with relatively old, i.e. relatively out-burnt fuel rods. Changes in the quotients between long-lived and short-lived nuclides, for instance $^{133}$Xe/$^{135}$Xe may as mentioned above indicate a fuel defect. The relation between long-lived and short-lived nuclides may also give information about how large or small the defect present is. If the defect is small, the fission gases will merely slowly flow out of the cladding, which involves that the short-lived nuclides to a relatively high degree have already decayed.

The box 10 represents in a corresponding manner an unit which is connected to the unit 8 and which comprises a computer for analysing measured chemical data and activity data of the reactor water. Also by means of merely such an analysis one may obtain much valuable information regarding possible defects on the fuel cladding tubes. For instance, an increase of measured absolute values of the iodine isotopes indicates that a secondary defect is present. In case of a secondary defect, reactor water will penetrate the interior of the cladding tubes and dissolve therein the partly water-soluble iodine carried by the reactor water out of the cladding tube. An increase of the absolute value of the percentage of neptunium indicates uranium washing-out, i.e. a secondary defect where uranium is in direct contact with the reactor water. By analysing the relation between $^{134}$Cs and $^{137}$Cs, one may have an indication of the burn-up degree of the fuel and the relation $^{136}$Cs/$^{137}$Cs indicates the reactor effect produced.

The box 11 represents a unit which is connected to the units 6, 9 and 10 and which comprises a computer which is arranged to perform an analysis and a comparison of all or at least many different measured data. Such an analysis may for instance comprise the correlation of possible relations between the point of time for a primary or secondary defect and operational changes. By such a correlation, one may have an indication of the type of defect. If there is a connection between the point of time for a primary defect and a control rod displacement, the fuel defect is probably a PCI-defect in the proximity of a regulation control rod. Except measured data, one may by such a comparison also take into consideration previously measured data and previously programmed data, which are stored in a memory unit, the box 12, which is connected to the unit 11 and forms a sort of reference library. Such programmed data may comprise experiences gained at far previous reactor occurrences or defect situations in the actual plant and also experiences from other nuclear plants. Advantageously, the memory unit 12 is continuously updated by the data obtained by the units 4–6, 9 and 10. By means of available telecommunication and computer technology, it is also possible to make an essentially continuous or at lest frequently repeated updating of the memory unit 12 by data from other nuclear plants by means of a physical connection (not disclosed in FIG. 1). By means of the unit 11, it is also possible to make comparisons between activities measured in the off-gases and the reactor water. Such comparisons may also give information about a fuel defect which has occurred and the size of the defect. For instance, the amount of free uranium on the core surfaces during defect free operation may be determined by means of an analysis of the relation between the release rate for $^{131}$I in the reactor water and the release rate for $^{133}$Xe in the off-gases. If a fuel defect has occurred, there is quickly a clear deviation in this relation. In order to be able to determine a fuel defect by even greater security, it is possible, by means of the unit 11, to correlate how for instance the relations $^{133}$Xe/$^{135}$Xe and $^{134}$Cs/$^{137}$Cs, and the absolute values of $^{131}$I and $^{239}$Np relate to each other.

From such an analysis, considering the development over the time, one may determine a number of defects, the size of the defects, and predict their development. By means of such information one may obtain guidelines for the continuing operation of the reactor by means of a unit represented by the box 13. The unit 13 is connected to the unit 11 and comprises a computer which is arranged to produce these guidelines on the basis of the analysis made. The guidelines comprise, of course, the possibility of immediate shutdown if any predetermined limit values regarding off-gas activities, water chemical data or operational data have been exceeded. Furthermore, the guidelines may comprise a shutdown at a predetermined future point of time based on a forecasted development of a predetermined fuel defect. These guidelines may via a connection be fed further from the unit 13 to the main control system of the plant, which is represented by the box 14. Consequently, the invention comprises an automatic control of a nuclear plant, which control takes into consideration the formation and the development of fuel defects, for instance automatic control of the control rod drive members, reactor water pumps etc. If the presence of a debris defect may be determined and if it may be determined that this defect is located in a certain part of the core, a suitable measure may be to continue the operation of the reactor and avoid all control rod movements in this part. In such a manner, the defect will develop more slowly towards a larger defect. In addition, said guidelines may comprise the measure of determining by flux-tilting the location in the core of the defect/defects.

FIG. 2 discloses schematically in blocks one example of a possible physical structure of a device by which the method according to the invention may be performed. Thereby, the unit 4, which corresponds to the box 4 in FIG. 1, is a separate unit as well as the unit 5 which corresponds to the box 5 in FIG. 1. The units 7, 8, 9, 10, 11, 12 and 13, which are disclosed in FIG. 1, are realized in a common computer plant 15. The unit 6 and 14 may be realized as a part of the process computer plant mentioned above and forming the control system of the nuclear plant. Moreover, in FIGS. 1 and 2, a connection 16 is disclosed, by which an alarm function may be activated if any limit vale is exceeded among the activities measured continuously by means of the unit 4. A corresponding connection 17 may also be provided from the unit 5 in the case that the reactor water data are produced continuously.

The invention is not limited to the embodiment disclosed but may be varied and modified within the scope of the following claims.

What is claimed is:

1. A method for evaluating the integrity of the nuclear fuel in a nuclear plant during operation of the plant, wherein the plant includes a reactor (1) enclosing a reactor core comprising a number of fuel cladding members (2) arranged to enclose said nuclear fuel, said method comprising the steps of:

determining (4) the value of each of a number of first parameters including activity data of the off-gases from the reactor, determining (5) the value of each of a number of second parameters including chemical data and activity data of the liquid flowing through the reactor, determining (6) the value of each of a number of operational parameters including at least one of the reactor effect, control rod position, actual fuel type, flow of off-gases, and flow of the liquid flowing through the reactor, standardizing (4, 5) said values of the first and second parameters in relation to said values of the operational parameters, analysing (6–9) said standardized values and said values of the operational parameters, estimating (6–9) the integrity of the fuel based on said analysis, and producing (13) guidelines for the continuing operation of the plant with regard to said estimation.

2. A method according to claim 1, characterized by the following step of:

controlling (14) the plant with regard to said guidelines.

3. A method according to claim 1, characterized in that said guidelines are produced in an essentially continuous manner at least during the operation of the plant.

4. A method according to claim 1, characterized in that said determining of the value of said first parameters is performed in an essentially continuous manner during the operation of the plant.

5. A method according to claim 1, characterized in that said analysis is performed with regard to historical data (12) concerning said parameters.

6. A method according to claim 5, characterized in that said historical data are obtained from a memory unit (12) in which they are stored.

7. A method according to claim 6, characterized in that said values are supplied to the memory unit (12) for updating and completion thereof.

8. A method according to claim 7, characterized in that said values are supplied to the memory unit in an essentially continuous manner during the operation of the plant.

9. A method according to claim 1, characterized in that said analysis comprises comparing said standardized values and said values of said operational parameters with historical data and predetermined data.

10. A device for evaluating the integrity of the nuclear fuel in a nuclear plant during operation of the plant, wherein the plant includes a reactor (1) enclosing a reactor core comprising a number of fuel cladding members (2) arranged to enclose said nuclear fuel, said device comprising:

first means (4) arranged to enable the determining of the value of each of a number of first parameters including activity data of the off-gases from the reactor, second means (5) arranged to enable the determining of the value of each of a number of second parameters including chemical data and activity data of the liquid flowing through the reactor, third means (6) arranged to enable the determining of the value of each of a number of operational parameters including at least one of the reactor effect, control rod position, actual fuel type, flow of off-gases, and flow of the liquid flowing through the reactor, fourth means (7, 8) arranged to enable the standardizing of said values of the first and second parameters in relation to said values of the operational parameters, fifth means (6–9, 15) arranged to enable the analysing of said standardized values and said values of the operational parameters, sixth means (6–9) arranged to enable the estimating of the integrity of the fuel based on said analysis, and seventh means (13) arranged to enable the producing of guidelines for the continuing operation of the plant taking said estimation into consideration.

11. A device according to claim 10, characterized by eighth means (14) arranged to enable the controlling of the plant taking said guidelines into consideration.

12. A device according to claim 10, characterized by a memory unit (12) arranged to store historical data concerning said parameters and in that said fifth means (6–9, 15) are arranged to perform said analysis with regard to these historical data.

* * * * *